A. LOSCALZO.
SAFETY FENDER.
APPLICATION FILED DEC. 9, 1916. RENEWED DEC. 6, 1919.

1,352,757.

Patented Sept. 14, 1920.
5 SHEETS—SHEET 1.

Inventor
A. Loscalzo
By his Attorney
Charles H. Wilson

A. LOSCALZO.
SAFETY FENDER.
APPLICATION FILED DEC. 9, 1916. RENEWED DEC. 6, 1919.

1,352,757.

Patented Sept. 14, 1920.
5 SHEETS—SHEET 4.

UNITED STATES PATENT OFFICE.

ANGELO LOSCALZO, OF NEW YORK, N. Y.

SAFETY-FENDER.

1,352,757.    Specification of Letters Patent.    Patented Sept. 14, 1920.

Application filed December 9, 1916, Serial No. 136,082. Renewed December 6, 1919. Serial No. 343,112.

*To all whom it may concern:*

Be it known that I, ANGELO LOSCALZO, residing at New York, in the county and State of New York, have invented certain new and useful Improvements in a Safety-Fender, of which the following is a specification.

This invention relates to a safety fender for vehicles; and the object thereof is to provide an improved and highly efficient fender mechanism adapted particularly for use upon an automobile, though it may be readily applied to other forms of vehicles, if desired.

A more detailed object is to provide a fender comprising a vertically disposed collapsible barrier in association with suitable gripping arms, and to provide efficient means for controlling and operating said parts.

A further object is to provide means whereby the impact of a person or object struck will automatically cause the operation of the above mentioned elements.

A further object is to provide means whereby the automatic operation of the device will be prevented at all times except when the vehicle is proceeding at greater than a predetermined speed.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:

Fig. 6ª is a view on a slightly enlarged scale of a detail of construction.

Figure 11:
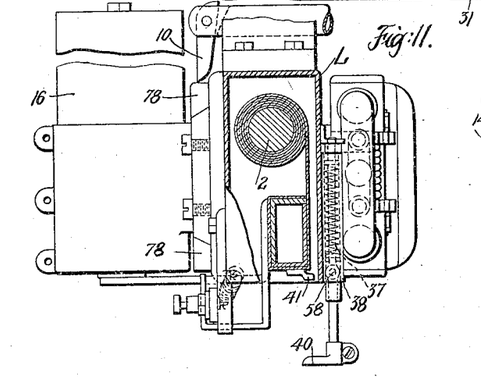
Fig. 11 is a vertical transverse sectional view taken upon the plane of line XI—XI of Fig. 9.
Figure 12:
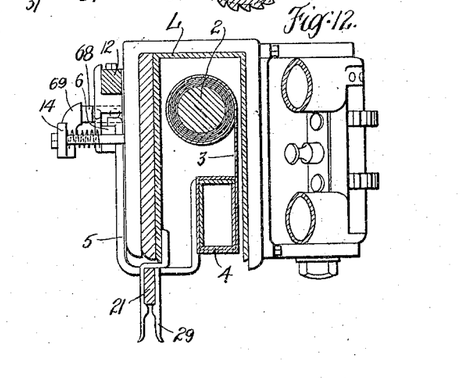
Fig. 12 is a similar sectional view taken upon the plane of line XII—XII of Fig. 9.
Figure 13:
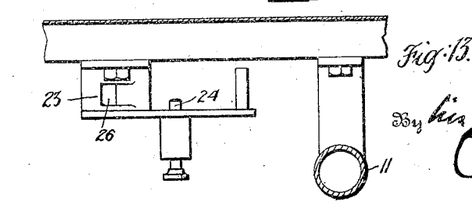
Fig. 13 is a fragmentary detail view illustrating a feature of construction of the vertical screen or barrier.

Referring now to the drawings for describing in detail the structure which is illustrated therein, the reference character L indicates a main casing. This may be of any suitable shape and size but is preferably rectangular in cross-section, as best seen in Figs. 11 and 12. It is intended to be arranged in a fixed position transversely in front of the vehicle, and is of a length to extend the full width of a vehicle. It may be connected to the vehicle in any desired manner, for instance by being fixed to the forward ends of the under frame parts 1 in the automobile structure illustrated.

Extending longitudinally within the casing L is a roller 2, about which is wound a curtain 3. A cross bar 4 is fixed to the free end of the curtain and a hook rod 5 projects from the cross bar to a point exteriorly at the rear of the casing where it engages a suitable latch device 6. The latch device 6 retains the cross bar supported in an elevated position within the casing L.

The latch device 6 is connected to be controlled by a buffer bar G which extends parallel with the casing L in a plane in advance of the casing. The buffer bar is supported by a pair of rods 7 slidably mounted upon the upper surface of the casing in suitable bearings 8 carried by the casing. Compression springs 9 surround the rods 7 and are disposed to press the buffer bar outwardly away from the casing.

The inner ends of the rods 7 carry latches 10 which are disposed to engage latches 11 carried at the opposite ends of a connecting rod 12, for pressing back the connecting rod whenever the rods 7 are slid inwardly, as when the buffer bar G encounters an obstacle. The latch device 6 is carried by the connecting rod 12 and one or more compression springs 13 are disposed for pressing the connecting rod toward the casing, said springs serving to yieldingly retain the latch device in latching position. The outer ends of the springs bear upon a bracket 14 carried by the casing.

The latches 11 are pivotally mounted at the ends of the connecting rod 12 and have lever-like extensions 15 for bearing against the casing, said extensions assisting in the backward movement of the connecting rod and also allowing the outer end of the latches to gradually free themselves from the latches of the rods 7 as the connecting rod moves backwardly.

From the above it will be understood that when the buffer bar G encounters an object and is moved backwardly, the connecting rod 12 is likewise moved backwardly and disengages the latch device 6 from the end of the hook rod 5, allowing the cross bar 4 to move downwardly, unwinding the curtain 3 from the roller 2, to instantly constitute a vertical barrier across the front of the vehicle. Any suitable means may be employed for hastening the downward projection of the curtain and for retaining it in a suitable rigid condition when down. To hasten the downward movement the drawing illustrates a pair of telescopic rods H employed, said rods each comprising a plurality of independently formed sections arranged to telescope within each other, the outermost, or largest sections, as 16, being fixed to the rear side of the casing L and the innermost or smallest sections 17 being fixed to the cross bar 4. Suitable compression springs 18 are disposed one within each of the rods H for forcing the smaller sections rapidly downwardly the instant the latch device 6 releases.

If desired, telescopic guide rods 19 may be arranged within the rods H for maintaining the springs 18 in suitable operative position. These are desirable especially where the springs 18 are of a length shorter than the length of the fully extended rods H, as illustrated.

As the rods H move downwardly they pass through and engage within suitable pocket-like braces 20 carried by the parts 1 of the vehicle, said parts 20 being disposed to receive pressure whenever an object is struck by the curtain, or by the cross rod 4.

Figure 1:
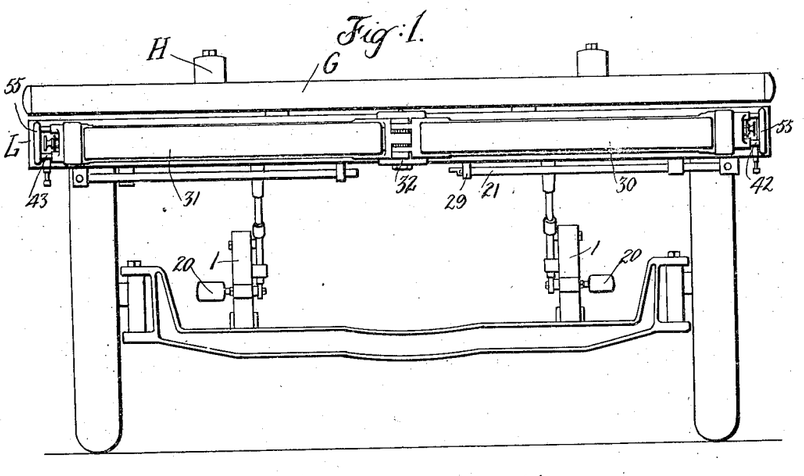
Figure 1 is a front elevational view of the device comprising this invention, the parts being shown in their normal collapsed position.
Figure 2:
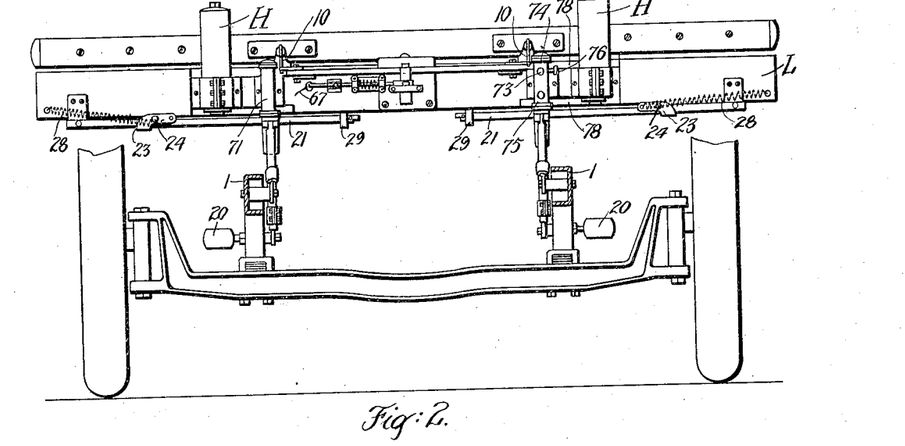
Fig. 2 is a similar view but taken from the reverse side of the mechanism, parts of the automobile structure being shown in vertical section.
Figure 16:
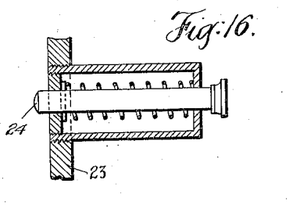
Fig. 16 is an enlarged detail sectional view illustrating a latch device carried by the vertical barrier.

In order to lend rigidity to the curtain while in its lowered position, a pair of brace rods 21 are pivotally connected to the casing L, as at 22. The free ends of these rods slidably engage within brackets 23 carried by the cross bar 4 at all times during the movement of curtain. When the cross bar 4 is in its elevated position the brace rods are horizontal and lie substantially parallel with the length of the casing L, as clearly shown in Fig. 2. As the cross bar 4 moves downwardly, however, latch devices 24 (see Fig. 16) carried by the brackets 23 engage the brace rods and swing the brace rods downwardly. As the cross bar reaches its lowermost position a tooth 25 formed at the free ends of the brace rods engage within pockets 26 formed in the bracket 23. At the same time a shoulder part 27 formed upon the brace rods engages against the brackets to limit the swinging of the brace rods. When the brace rods come to rest, in the manner indicated, they stand at an incline, as clearly shown in Figs. 3 and 6, and thereby constitute a rigid brace for the curtain adapted to prevent approximately all sidewise movement of the curtain.

Suitable tension springs 28 engage between the brace rods and the casing L for urging the brace rods toward either of their positions, said springs being disposed to cross the pivots 22 as the brace rods swing. If desired, snap catches 29 may be arranged for yieldingly holding the brace rods in their elevated position.

Pivotally carried by the casing L to swing in a horizontal plane are a pair of gripping arms 30 and 31, the pivotal support as 32 being disposed substantially midway of the length of the casing L. A coil spring 33 surrounds the pivot 32 and has its opposite ends fixed one to each of the arms 30 and 31, the tension of the spring being such as to urge the outer ends of the arms toward each other, or into gripping position. The gripping arm 30 is provided with a toothed or ratchet surface 34 concentric with the pivot 32 and the gripping arm 31 carries a yielding dog 35 for engaging the teeth 34 to retain the arms in any advanced position which they may assume during their operation.

In order to retain the gripping arms in their normal inoperative position, a pair of slide bolts 36 are employed, said slide bolts being carried by the casing L one adjacent each end of said casing and being spring pressed upwardly by suitable springs 37 carried within the housings 38 through which the bolts slide. The upper ends of the bolts engage through eyes formed in lugs 39 carried by the arms. The bolts are arranged in a substantially vertical position and their lower ends as 40 project into the path of strikers 41 carried by the cross bar 4.

Thus when the cross bar 4 moves downwardly the slide bolts are withdrawn from engagement with the arms and the spring 33 is left instantly free to swing the arms forwardly.

In order to improve the operation of the gripping arms said arms are preferably provided with extensions 42 and 43. These extensions are telescopically carried by the arms 30 and 31 and are spring pressed outwardly from the ends of said arms 30 and 31, the lugs 39 being carried by the extensions in order that the slide bolts will serve the added purpose of retaining the extensions in telescoped position. When the slide bolts are withdrawn to free the arms the extensions are also freed by the same movement of the slide bolts and are instantly projected from the ends of the arms.

The manner of connecting the extensions 42 and 43 with the arms 30 and 31 preferably includes forming the arms each as a pair of tubular members 44 arranged in parallel relation and adapted to telescopically receive a pair of rods 45 constituting the extensions. The rods 45 have pivotally connected sections 46 at their inner ends within the members 44 and compression springs 47 are arranged within the members 44 behind the sections 46. At the outer ends of the members 44 pivotally connected sleeves 48 are provided through which the rods 45 slidably extend. A coil spring 49 is fitted about the pivot rod 50 and has one of its ends bearing against a part fixed to the members 44 and its other end bearing against a part fixed to the sleeves 48 adapted to urge the sleeves forwardly. A ratchet surface 51 is carried by the members 44 and a spring pressed dog 52 is carried by the sleeves for retaining the sleeves in any forward position which they may assume in operation.

Figures 4, 5:
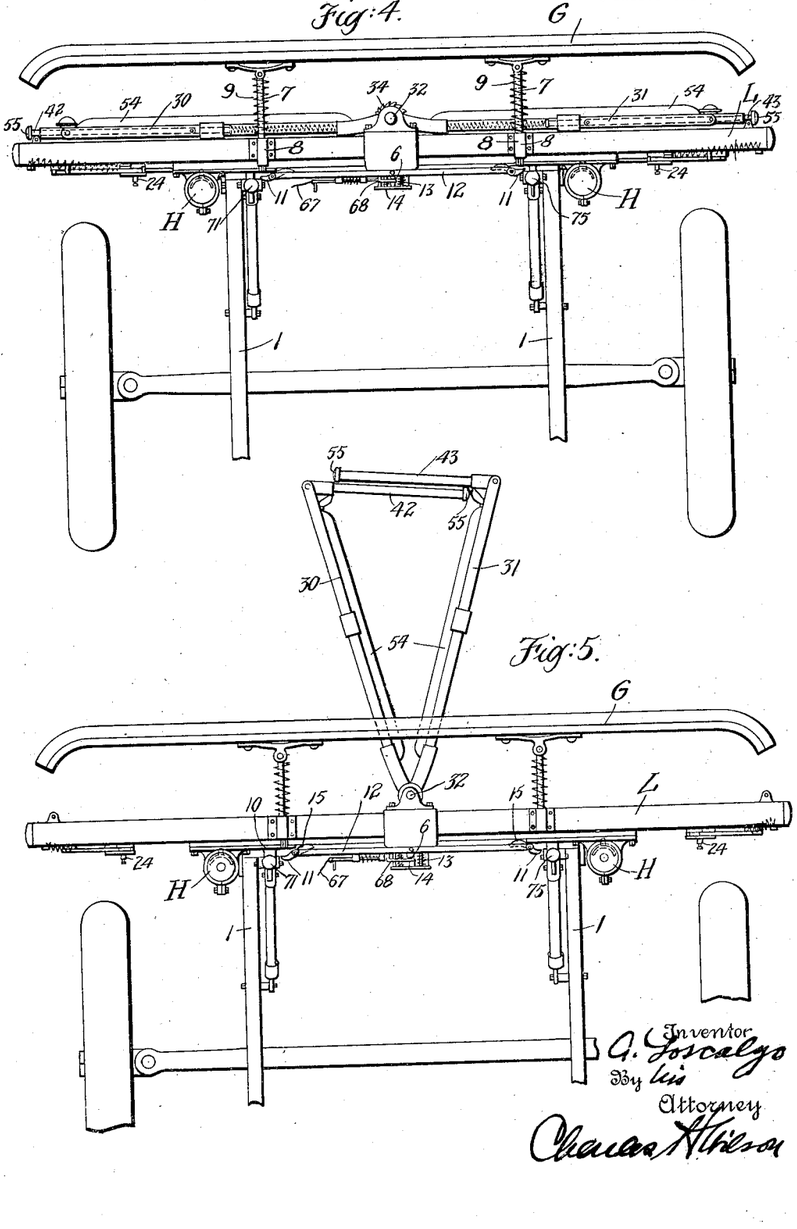
Fig. 4 is a top plan view showing the parts in their normal collapsed position, as shown in Fig. 2.
Fig. 5 is a view similar to that shown in Fig. 4, but showing the parts in their extended position, as in Fig. 3.

When the slide bolts are withdrawn the springs 47 instantly project the rods 45 outwardly from the members 44 until the pivot pins 53 between the rods 45 and the sections 46 come into alinement with the pivot rod 51. Until this time the rods 45 serve to retain the spring 49 against functioning, but immediately the pivot pin 53 comes into alinement with the pivot rod 51 the spring 49 is free to function and instantly throws the extension forwardly toward the position indicated in Fig. 5.

Suitable pads or the like as 54 and 55 may be provided upon the gripping arms and upon the extensions for preventing injury to the person struck.

The sections 46 are preferably provided with shoulders 56 for engaging shoulders within the members 44 to determine the outermost position of said sections 46.

The lower ends of the slide bolts are preferably pivotally connected to the upper portion of said bolts, as at 58, whereby said lower ends will be free to swing out of engagement with the strikers after the slide bolts have been withdrawn for a suitable distance.

It is believed that the full operation of this device will be understood from the foregoing and for this reason a further detailed description of the operation is deemed unnecessary. It is evident that the moment an obstacle is encountered by the buffer bar G to force said buffer bar backwardly, the hook rod is released and the curtain is projected downwardly to provide a transverse barrier in front of the vehicle, and as the curtain starts its downward movement the strikers 41 thereon withdraw the slide bolts and release the gripping arms and extensions whereupon said arms and extensions swing outwardly toward the position indicated in Fig. 5 for gripping the object struck. The gripping arms will serve to prevent the object from falling after having been struck.

Figure 15:
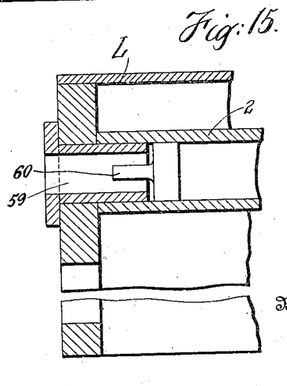
Fig. 15 is a fragmentary detail sectional view taken upon the plane of line XV—XV of Fig. 10.

In order to return the parts to their normal position the operator disengages the lower ends of the brace rods from the brackets 23 and rotates the roller 2 to wind the curtain again upon said roller and bring the cross bar 4 into its elevated position with the hook rod engaged by the latch device 6. In order to rotate the roller 2 a suitable tool may be inserted through an opening 59 in the end wall of the casing into engagement with a rectangular lug 60 carried by the roller 2, as clearly seen in Fig. 15.

After the curtain has been re-wound the dogs 35 and 52 are withdrawn from engagement with their respective ratchet teeth and the arms are swung backwardly so that the slide bolts engage through the eyes of the lugs 39.

Figure 14:
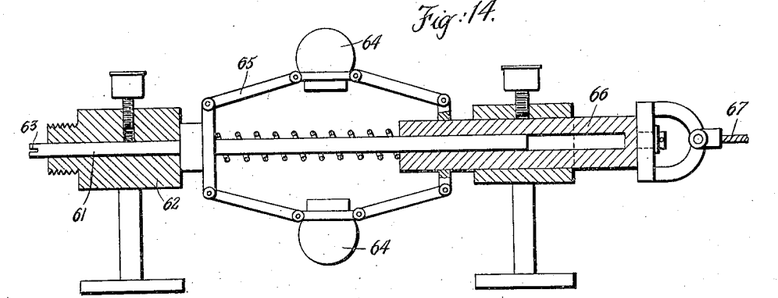
Fig. 14 is a detail sectional view illustrating a type of governor device which may be employed in connection with the structure shown in the other figures.

Any desired form of device may be employed for preventing the operation of the parts of this device except when the vehicle is traveling at a pre-determined speed. An example of such mechanism is illustrated in Fig. 14, in which it will be seen that a governor device is employed. This device comprises a shaft 61 rotatably mounted in a bearing brace 62 and having means as 63 at its outer end for connection with a flexible shaft or the like leading to drive means associated with the wheels of the vehicle. By this means the rotation of the vehicle wheels will rotate the shaft 61. This rotary movement will be communicated to a pair of weights 64 supported by suitable links 65. As the speed of rotation increases the centrifugal force developed by the weights 64 will produce a sliding movement of a sleeve 66. A cord or wire 67 extends from the sleeve 66 to a filler block 68 which is disposed intermediate a fixed lug 69 and the movable part of the latch device 6 and the sliding movement of the sleeve 66 will cause said filler blocks to be moved out of position between said lug 69 and said movable part of the latch device 6. A suitable spring 70 is provided for retaining the filler block normally in position between the lug 68 and the movable part of the latch device. By this means it is evident that the latch device 6 is positively retained against operation except when the vehicle is traveling at a speed sufficient to throw the weights 64 outwardly to a point where the filler block is withdrawn.

Figures 6, 6A, 7, 8:
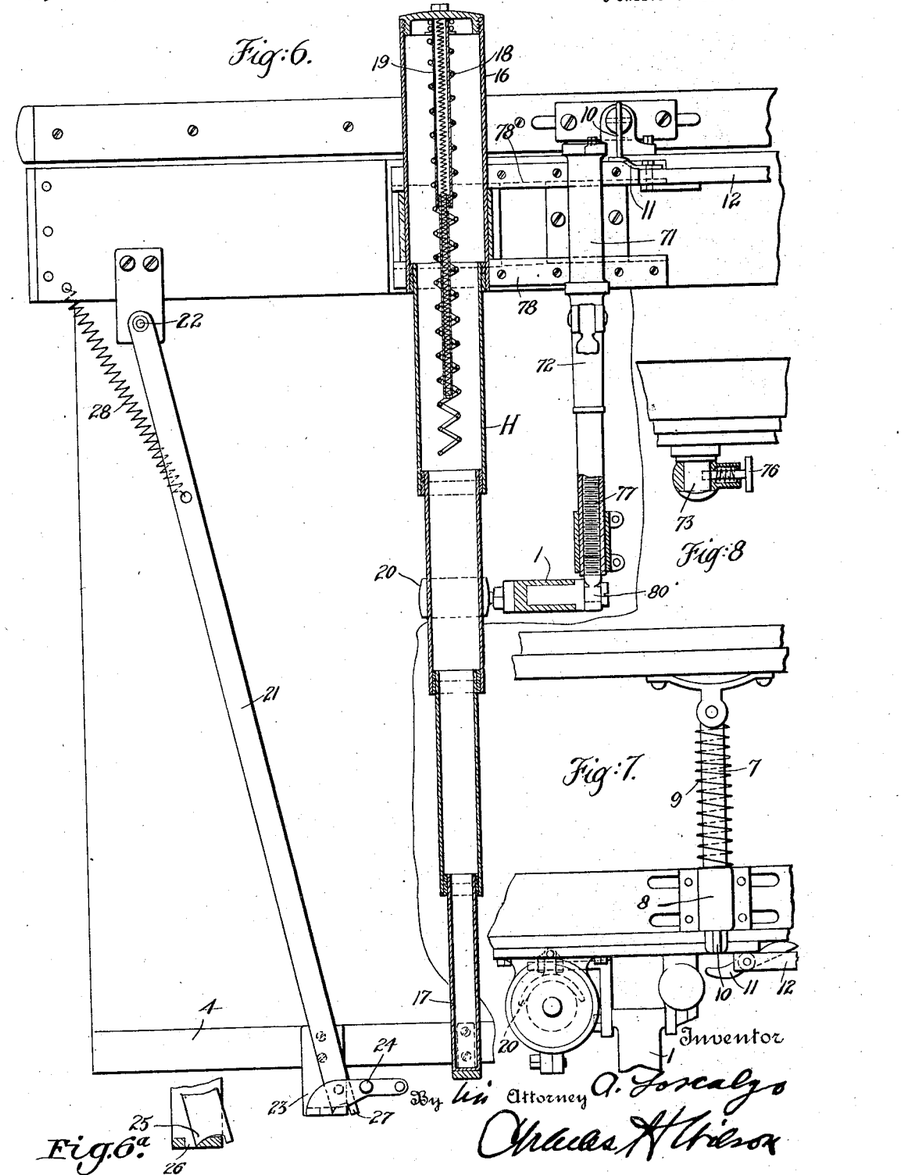
Fig. 6 is an enlarged detail view, partly in section, for better illustrating the structure shown at the lefthand side of Fig. 3.
Fig. 7 is a similarly enlarged top plan view of a portion of the structure shown in Fig. 6.
Fig. 8 is an enlarged fragmentary detail view of a part of the device illustrated in Fig. 6.
Figures 9, 10:
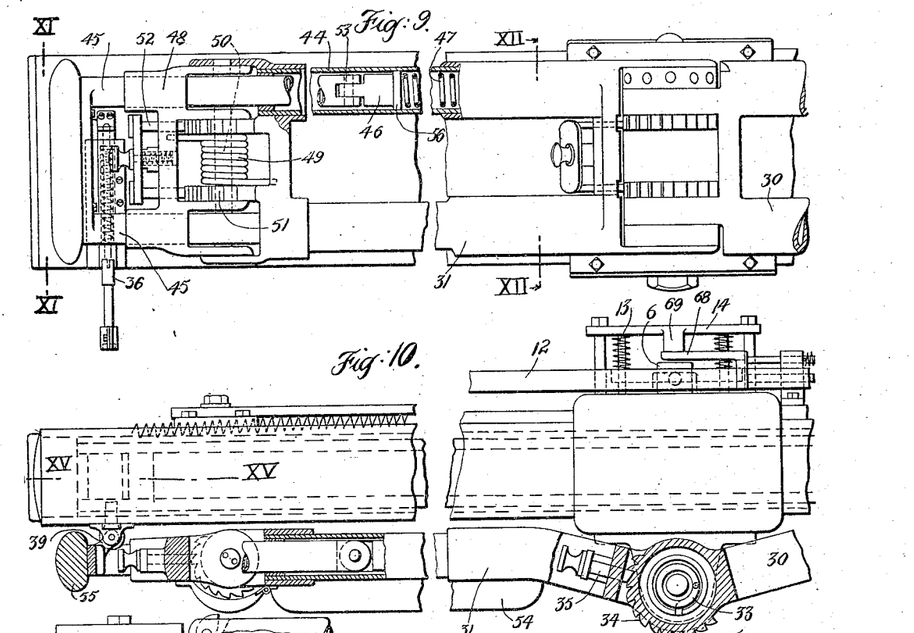
Fig. 9 is an enlarged elevational detail view showing the construction of parts of the folding arms.
Fig. 10 is a plan view of the structure shown in Fig. 9, parts being illustrated in section.

When the device of this invention is intended to be used upon an automobile structure it is desirable that it be pivotally connected to the frame of the automobile so that it may be conveniently swung to a position out-of-the-way for permitting the operator to have free access to the cranking lever of the automobile. The pivotal connection may be afforded by any desired means, but preferably it includes a sleeve 71 which is carried by the casing and which is rotatably mounted at the upper end of a vertical standard 72 which is fixed to the part 1 of the vehicle, the sleeve 71 being located adjacent one end of the casing L. Adjacent the opposite end of the casing one or more lugs 73 are fixed to the casing and are disposed to engage within a corresponding number of apertures 74 formed through the upper end of a standard 75, fixed to the opposite member 1 of the vehicle. A snap catch 76 is arranged for detachably retaining the lugs in position, as best seen in Fig. 8. By withdrawing the catch 76 the casing may be readily swung about the standard 72 at will.

In order to adjust the position of the casing to meet the requirements of different vehicles to which it may be attached, the standards 72 are internally threaded at their lower ends and adjustably receive threaded members 77 which are fixed to the members 1 of the vehicle. Inter-rotation between the members 77 and the standards will alter the elevation of the casing L relatively to the members 1. Also the sleeve 71 and the member carrying the lugs 73 are adjustably connected to the casing L by being received between guide members 78 so that they may be fixed in adjusted positions relatively to the length of the casing. The sections 16 of the telescopic rods H are likewise adjustably connected to the casing by means of the members 78 for the same purpose, as will be clearly seen from an inspection of Figs. 6 and 11.

Figures 3, 17:
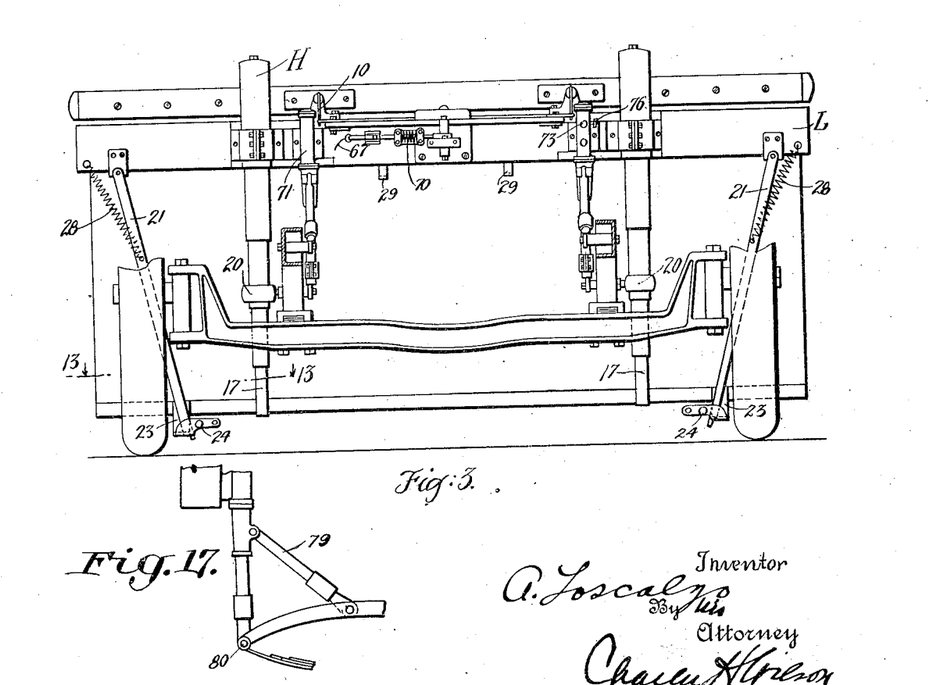
Fig. 3 is a view similar to that shown in Fig. 2, but illustrating the parts of the device i ntheir extended condition.
Fig. 17 is a detail view illustrating the supporting members for connecting the fender mechanism to a vehicle.

By referring to Fig. 17, it will be seen that a diagonal brace 79 is provided in connection with the standards 72 for bracing said standards. Preferably the connection at the lower end of the standards with the part 1 of the vehicle, as at 80, is a pivotal one so that the standards may be swung for proper adjustment relatively to the vertical. The diagonal braces 79 are preferably made up of two sections telescoping together in a suitable manner whereby the length of the braces may be altered to retain the standards in any adjusted position. The longitudinal adjustment of the braces also coöperates with the longitudinal adjustment of the standards for the same purpose.

Having thus described my invention what I claim as new and desire to secure by Letters Patent is:

1. A device of the class described, comprising a fender mechanism, means for connecting one end of the fender mechanism to a vehicle, said means comprising in part a pivotal mounting for the fender mechanism whereby said fender mechanism may be swung bodily in a horizontal plane for giving more convenient access to portions of the vehicle, and independent supporting means for connecting the opposite end of the fender mechanism to the vehicle.

2. A device of the class described, comprising a fender mechanism, means for connecting the fender mechanism to a vehicle, said means comprising in part a pivotal mounting for the fender mechanism whereby said fender mechanism may be swung bodily in a horizontal plane for giving more convenient access to portions of the vehicle, said pivotal mounting being disposed adjacent one end of the fender mechanism, and releasable latch mechanism engaging between the opposite end of the fender mechanism and the support thereof.

3. A device of the class described, comprising a fender mechanism, means for supporting the fender mechanism upon a vehicle, said means comprising a vertical standard adapted to be fixed by its lower portion to the vehicle and having its upper portion fixed to the fender mechanism, and means comprised in the standard for altering the length thereof to adjust the vertical disposition of the fender mechanism relatively to the vehicle.

4. A device of the class described, comprising a fender mechanism, a support for supporting the fender mechanism connected to a vehicle, said support comprising vertically disposed telescoping members adjustable relatively to each other for altering the elevation of the fender mechanism, and said support also comprising an angle brace formed of a pair of telescoping members adjustable relatively to each other to accommodate adjustment of the first mentioned telescoping members.

5. A fender mechanism comprising in part a member formed of a plurality of telescoping sections, means for retaining the sections in nested relation when the fender is not in operation, means for distending said sections into fending position, and means for automatically producing operation of the last mentioned means when an object is struck.

6. A fender mechanism comprising in part a member formed of a plurality of telescoping sections, means for retaining said sections in nested relation when the fender is not in operation, means for distending said sections into fending position, a guard bar arranged in front of said member movable upon contact with an object struck, and means associated with said guard bar for controlling the operation of said last mentioned means.

7. A fender mechanism comprising in part a member formed of a plurality of tubular telescoping sections normally nested together, a coil spring arranged within said member disposed to urge the sections of the member into distended position, a guide rod also comprising telescoping sections arranged within said spring to guide said spring, and independent means for urging the sections of the guide rod into distended position.

8. A fender mechanism comprising in part a member formed of a plurality of tubular telescoping sections normally nested together, a coil spring arranged within said member disposed to urge the sections of the member into distended position, a guide rod also comprising tubular telescoping sections arranged within said spring to guide said spring, and a compression spring contained within said guide rod for urging the sections of the guide rod into distended position.

9. In a fender mechanism, an elongated casing adapted to be arranged transversely in front of a vehicle, a normally inoperative fender part carried within said casing, means connected to the casing having a movable portion movable with the fender part for bracing the fender part when the fender part is in operative position, and auxiliary brace means adapted to be carried by the vehicle disposed to be engaged by said member when the fender part is in operative position for bracing said member.

10. In a fender mechanism, an elongated casing adapted to be arranged transversely in front of a vehicle, a normally inoperative fender part carried within said casing, a pair of brace elements one arranged adjacent each end of the casing having portions engaging the fender part to brace the fender part, an auxiliary brace means adapted to be carried by the vehicle for bracing the first brace elements, and means whereby the first brace elements are adjustably connected longitudinally of the casing for the purpose set forth.

11. In a fender mechanism, a casing, a curtain normally contained within the casing, impact controlled means for projecting a portion of the curtain out of the casing to constitute a fender part, and a pair of arms each pivotally connected with the casing by one end to swing into bracing engagement with a portion of the curtain as the curtain is projected.

12. In a fender mechanism, a casing, a curtain normally contained within the casing, impact controlled means for projecting a portion of the curtain out of the casing to constitute a fender part, a brace rod pivotally connected by one of its ends with the casing, said brace rod being normally in an inoperative position, means for swinging said rod into operative position when the curtain is projected, and means operative to urge the rod toward either its operative or inoperative position.

13. A fender mechanism comprising, a casing, a curtain normally out of fending position but movable into fending position, means for moving said curtain into fending position, a pair of arms arranged in front of said curtain pivotally mounted to swing toward each other, means engaging between a part carried by said casing and the outer ends of said arms to retain said arms against swinging when said curtain is in normal position, and means whereby said arms will swing toward each other when said curtain is moved to fending position.

14. A fender mechanism comprising a pair of arms pivotally mounted to swing toward each other for the purpose set forth, each of said arms comprising a plurality of sections pivotally connected together, releasable means for retaining said arms against swinging toward each other, and means whereby adjacent sections of said arms will swing relatively to each other to bow said arms upon the release of said retaining means.

15. A fender mechanism comprising a pair of arms pivotally mounted to swing toward each other for the purpose set forth, each of said arms comprising a plurality of sections pivotally connected together, releasable means for retaining said arms against swinging toward each other, means whereby adjacent sections of said arms will swing relatively to each other to bow said arms upon the release of said retaining means, and means for retaining the arms bowed.

16. In a fender mechanism, a casing, a fender part normally inoperative within the casing, a pair of gripping arms pivotally connected exteriorly of the casing, impact controlled means for moving the fender part into operative position exteriorly of the casing, and means controlled by the movement of the fender part for moving said arms toward gripping position.

17. A fender mechanism comprising a pair of gripping arms pivotally mounted to swing toward each other, a slidable extension carried by at least one of said arms, said extension being normally in a non-extended position, means urging the extension toward extended position, means urging said arms toward gripping position, and impact controlled means for retaining the extension in non-extended position.

18. A fender mechanism comprising a pair of gripping arms pivotally mounted to swing toward each other, a slidable extension carried by at least one of said arms, said extension being normally in a non-extended position, means urging the extension toward extended position, means urging said arms toward gripping position, and impact controlled means for retaining the extension in non-extended position, a support for said arms, and said retaining means engaging between said support and said extension whereby also to retain at least one of said arms against swinging.

19. In a fender mechanism, a supporting member, a pair of gripping arms pivotally mounted upon the supporting member to swing into and out of gripping position, said arms being tubular, extension members slidably carried within said arms adapted to be projected from the outer ends thereof, means constantly urging the extension members toward extended position, means constantly urging said arms toward gripping position, and impact controlled retaining means engaging between the supporting member and said extension members arranged to serve the double purpose of retaining the gripping arms against swinging and the extension members against being projected.

In testimony whereof I affix my signature in the presence of two witnesses.

ANGELO LOSCALZO.

Witnesses:
LOUIS BRANDWEIN,
MORRIS WEINBERG.